United States Patent
Zhilinsky

(10) Patent No.: US 10,139,706 B2
(45) Date of Patent: Nov. 27, 2018

(54) BAYONET LENS MOUNTS

(71) Applicant: Sensors Unlimited, Inc., Princeton, NJ (US)

(72) Inventor: Dmitry Zhilinsky, Richboro, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/428,251

(22) Filed: Feb. 9, 2017

(65) Prior Publication Data

US 2018/0224719 A1    Aug. 9, 2018

(51) Int. Cl.
| | |
|---|---|
| *G03B 17/14* | (2006.01) |
| *G02B 7/14* | (2006.01) |
| *G02B 27/00* | (2006.01) |
| *H04N 5/225* | (2006.01) |

(52) U.S. Cl.
CPC ............... *G03B 17/14* (2013.01); *G02B 7/14* (2013.01); *G02B 27/0006* (2013.01); *H04N 5/2252* (2013.01); *H04N 5/2254* (2013.01)

(58) Field of Classification Search
CPC .......... G03B 17/14; G03B 17/08; G02B 7/14; G02B 27/0006; H04N 5/2252; H04N 5/2254

See application file for complete search history.

(56) References Cited

U.S. PATENT DOCUMENTS

| | | | | |
|---|---|---|---|---|
| 4,071,066 A | * | 1/1978 | Schaeffer | A45C 11/22 206/316.2 |
| 4,095,247 A | | 6/1978 | Rehn | |
| 4,168,897 A | * | 9/1979 | Gates | G03B 17/14 396/25 |
| 4,437,752 A | * | 3/1984 | Akashi | G03B 17/18 396/283 |
| 4,457,609 A | | 7/1984 | Tomino et al. | |
| 4,766,453 A | * | 8/1988 | Shiokama | G03B 17/14 396/532 |
| 4,994,829 A | * | 2/1991 | Tsukamoto | G03B 17/08 359/507 |
| 5,177,515 A | * | 1/1993 | Tsukamoto | G03B 17/08 396/27 |
| 5,530,499 A | * | 6/1996 | Mori | G03B 17/08 396/29 |
| 5,701,518 A | * | 12/1997 | Honda | G03B 17/08 396/29 |
| 7,004,672 B2 | | 2/2006 | Iikawa et al. | |
| 2013/0215253 A1 | * | 8/2013 | Achtel | G03B 17/08 348/81 |
| 2015/0092416 A1 | | 4/2015 | Potucek et al. | |
| 2017/0192340 A1 | * | 7/2017 | Warren | B29C 65/4835 |

\* cited by examiner

*Primary Examiner* — Nicholas G Giles
(74) *Attorney, Agent, or Firm* — Locke Lord LLP; Scott D. Wofsy; Joshua L. Jones

(57) ABSTRACT

A bayonet mounting system includes an interchangeable component. The system also includes a housing having a cylindrical opening with a sealing surface on a radially inward facing surface and a frustoconical surface that tappers radially outwardly from the radially inward facing surface at the cylindrical opening. The frustoconical surface is configured to radially compress at least a portion of a resilient member during attachment of the interchangeable component to the housing. The housing also has a groove extending radially outward of at least a portion of the frustoconical surface configured to retain the interchangeable component to the housing in a bayonet latching fashion.

9 Claims, 2 Drawing Sheets

BAYONET LENS MOUNTS

BACKGROUND OF THE INVENTION

1. Field of the Invention

The present disclosure relates to optical systems, and more particularly to bayonet lens mounts for imaging systems and the like.

2. Description of Related Art

Optical systems such as cameras with interchangeable lenses traditionally use bayonet mounts to attach and detach lenses from the body of the camera. However, the bayonet mount per se does not prevent incursion of water, dust, and the like. Moreover, in digital cameras, for example, while a lens is removed from its bayonet mount, the camera internals are particularly vulnerable to exposure to water, dust, and the like. Therefore, conventional imaging systems require care in order to prevent exposure of sensitive optical and electrical components to water, dust, and the like.

The conventional techniques have been considered satisfactory for their intended purpose. However, there is an ever present need for improved lens mounts and the like. This disclosure provides a solution for this problem.

SUMMARY OF THE INVENTION

A bayonet mounting system includes an interchangeable component. The system also includes a housing having a cylindrical opening with a sealing surface on a radially inward facing surface and a frustoconical surface that tappers radially outwardly from the radially inward facing surface at the cylindrical opening. The frustoconical surface is configured to radially compress at least a portion of a resilient member during attachment of the interchangeable component to the housing. The housing also has a groove extending radially outward of at least a portion of the frustoconical surface configured to retain the interchangeable component to the housing in a bayonet latching fashion.

The system can include at least one of the resilient member retainable within a circumferentially extending channel in an radially outward facing surface of the interchangeable component, configured to seal the radially outward facing surface to the radially inward facing surface. The system can include an O-ring seated in a circumferential channel defined around the interchangeable component. The O-ring can engage a cylindrical, non-frustoconical surface of the housing inward of the frustoconical engagement surface. A second O-ring can be seated in a separate circumferential channel of the interchangeable component from the first O-ring. Both the first O-ring and the second O-ring can engage the cylindrical, non-frustoconical surface of the housing.

An imaging sensor package can be seated in the housing opposite the interchangeable component, wherein the imaging sensor package includes an imaging sensor. The imaging sensor package can be sealed against or to the housing. The housing can include a circumferential seal groove with a sensor seal seated therein, wherein the sensor seal sealingly engages both the housing and the imaging sensor package. The circumferential groove can face inward, away from the receptacle for an interchangeable component. The seal can include at least one of an O-ring, adhesive, or thermally conductive material.

The housing can define a camera enclosure inward from the imaging sensor package housing electrical components in electrical communication with the imaging sensor, wherein the imaging sensor package is sealed against or to the housing to seal off the camera enclosure. There can be an optical path from the interchangeable component to the imaging sensor package that is free of windows.

In another aspect, a bayonet mounting system includes a housing defining a bayonet receptacle having a bayonet retainer groove extending in a circumferential direction about a longitudinal axis of the bayonet receptacle. An opening portion of the bayonet receptacle includes a frustoconical engagement surface that narrows as it extends inward from an opening surface of the housing. The bayonet retainer groove axially overlaps with the frustoconical engagement surface. An interchangeable component including a circumferentially extending bayonet tab is engaged with the bayonet retainer groove.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
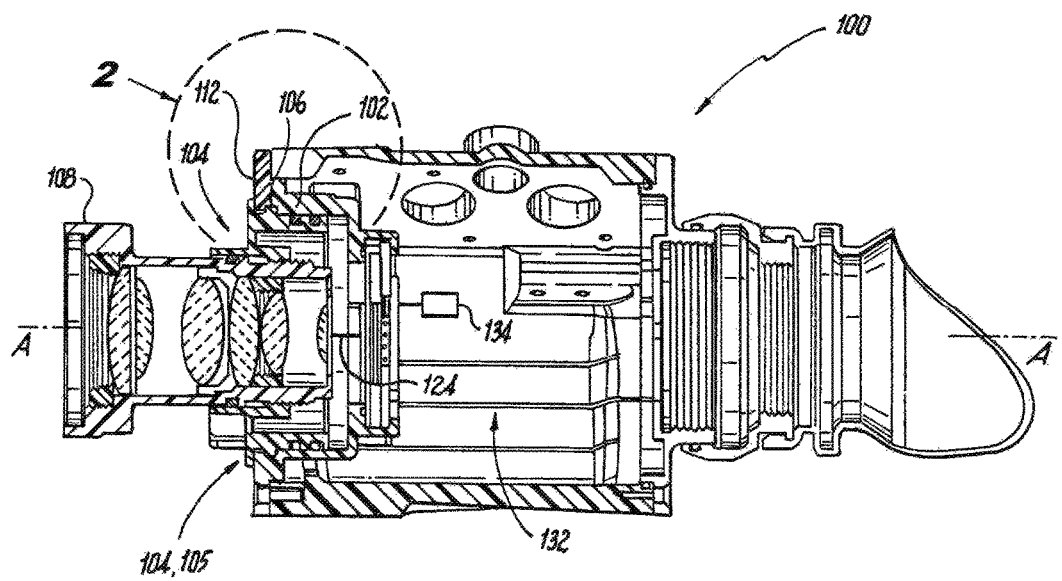
FIG. 1 is a cross-sectional side-elevation view of an exemplary embodiment of an imaging system constructed in accordance with the present disclosure, showing the lens assembly, imaging sensor, and interior camera chamber.

Reference will now be made to the drawings wherein like reference numerals identify similar structural features or aspects of the subject disclosure. For purposes of explanation and illustration, and not limitation, a partial view of an exemplary embodiment of a bayonet mounting system in accordance with the disclosure is shown in FIG. 1 and is designated generally by reference character 100. Other embodiments of bayonet mounting systems in accordance with the disclosure, or aspects thereof, are provided in FIGS. 2-3, as will be described. The systems and methods described herein can be used to facilitate interchanging lens assemblies, increase the useable life of seal rings, e.g., for water- and dust-proofing, and to seal sensitive camera components when an interchangeable lens is not engaged to the camera housing.

Figure 3:
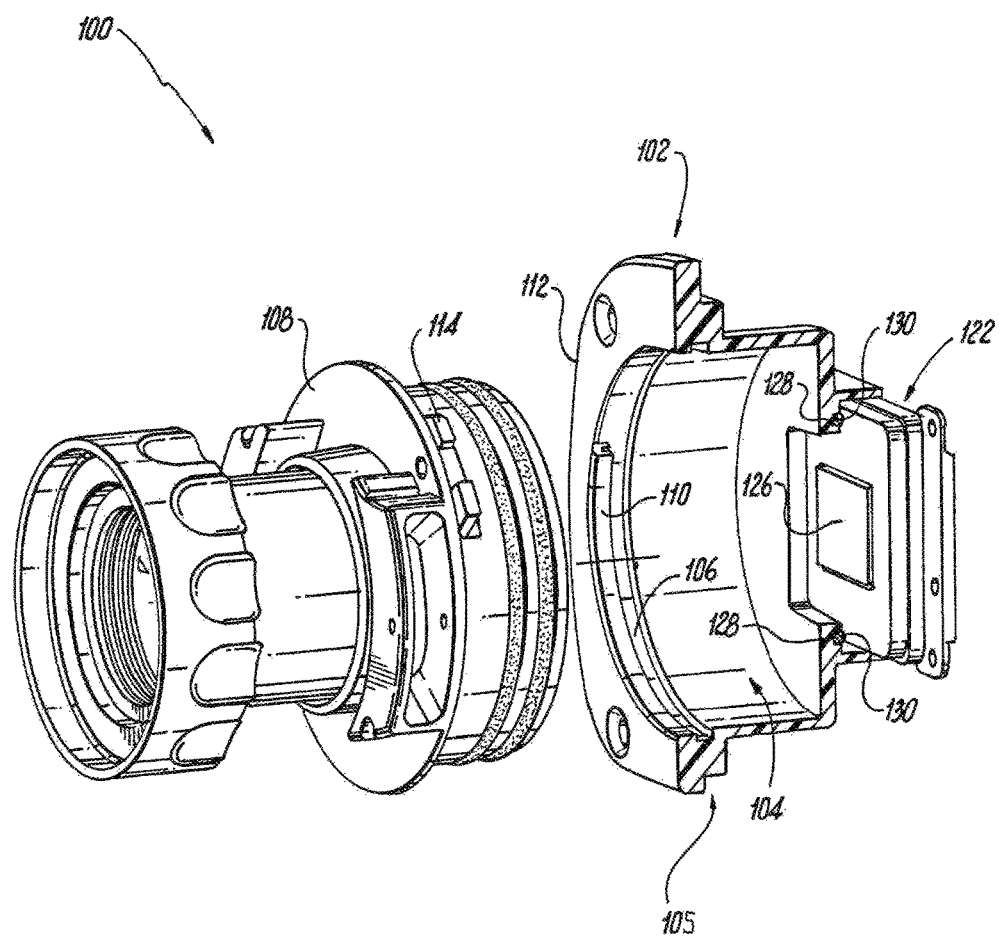
FIG. 3 is an exploded, partial cross-sectional perspective view of a portion of the imaging system of FIG. 1, showing the seal at the imaging sensor package for sealing the interior camera enclosure.

A bayonet mounting system 100 includes a housing 102 defining a bayonet receptacle 104 as a cylindrical opening portion 105 having a bayonet retainer groove 106 extending in a circumferential direction about a longitudinal axis A of the bayonet receptacle 104. Longitudinal axis A is identified in FIG. 1, and bayonet receptacle 104 and bayonet retainer groove 106 are shown in FIG. 3. FIG. 3 also shows an interchangeable component 108, shown in an illustrated embodiment as a lens assembly, removed from housing 102.

Figure 2:
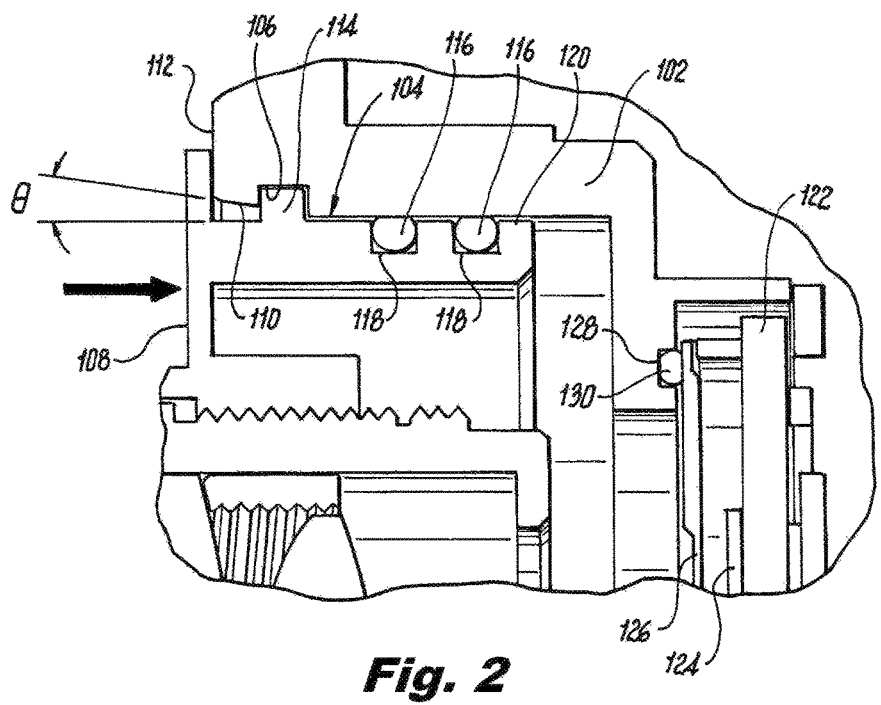
FIG. 2 is a cross-sectional side-elevation view of a portion of the imaging system of FIG. 1, showing the bayonet mounting features.

An opening portion 105 of the bayonet receptacle 104 includes a frustoconical engagement surface 110, identified in FIG. 2, which decreases in radial dimension as it extends inward (105 in the direction of the large arrow in FIG. 2) from an opening surface 112 of the housing 102, in other words, tapers radially outwardly from the radially inward facing surface of the cylindrical opening portion. The frustoconical engagement surface 110 defines an angle θ relative to the longitudinal axis A of FIG. 1. The bayonet retainer groove 106 axially overlaps with the frustoconical engagement surface 110 and extends radially outward of at least a portion of the frustoconical engagement surface 110, so bayonet retainer groove 106 is set in from the frustoconical engagement surface 110. The interchangeable component 108, and in particular a circumferentially extending bayonet tab 114 of the interchangeable component 108, is engaged with the bayonet retainer groove 106. The bayonet retainer groove 106 retains the interchangeable component 108 to the housing 102 in a bayonet latching fashion.

System 100 includes two resilient members, O-rings 116, each seated in a respective circumferential channel 118 defined around the interchangeable component 108. The O-rings 116 both engage and are compressed against an inward facing cylindrical, non-frustoconical surface 120 of the housing 102 inward of the frustoconical engagement surface 110 to form a watertight seal against incursion of water, dust, or the like entering between interchangeable component 108 and housing 102. Compared to traditional configurations, the angle θ of the frustoconical engagement surface 110 where it meets bayonet retainer groove 106 reduces the force required to engage interchangeable component 108 into receptacle 104, facilitates angular alignment of interchangeable component 108 and housing 102 during assembly, and softens the wear and tear on O-rings 116 as interchangeable component 108 is repeatedly engaged and disengaged with housing 102. The frustoconical engagement surface 110 is configured to radially compress at least a portion of the resilient member during attachment of the interchangeable component 108 to the housing 102.

Referring now to FIGS. 2 and 3, an imaging sensor package 122 is seated in the housing 102 internal from and opposite to the interchangeable component 108 and receptacle 104. The imaging sensor package 122 includes an imaging sensor 124 sealed within the sensor package 122 in optical communication with interchangeable component 108 through sensor window 126. The imaging sensor package 122 is itself can be sealed against or to the housing 102. The housing 102 includes a circumferential groove 128 with a sensor seal 130 seated therein, wherein the sensor seal 130 sealingly engages the imaging sensor package 122. The circumferential groove 128 faces inward, away from the receptacle 104. The seal 130 can include an O-ring, adhesive, thermally conductive material, or any other suitable type of seal.

With reference again to FIG. 1, the housing 102 defines a camera enclosure 132 inward from the imaging sensor package 122, opposite the interchangeable component 108. Camera enclosure 132 houses electrical components 134 in electrical communication with the imaging sensor 124, wherein the imaging sensor package 122 is sealed to the housing 102 as explained above to seal off the camera enclosure, e.g., against incursion of water, dust, or the like, even when interchangeable component 108 is not engaged in receptacle 104. There is an optical path 134 from the interchangeable component 108 to the imaging sensor package 122 that is free of windows.

The methods and systems of the present disclosure, as described above and shown in the drawings, provide for interchanging lens assemblies and the like with superior properties including ease of interchangeability, improved low-force operation, improved O-ring life, and improved sealing of the internal camera enclosure even when no lens assembly is engaged to the camera housing. Additionally, systems and methods as described herein can eliminate a sealing window used in traditional configurations, drastically reducing back working distance required for a mating lens, which significantly reduced lens cost by simplifying optical design criteria. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bayonet mounting system comprising:
   an interchangeable component; and
   a housing having a cylindrical opening with a sealing surface on a radially inward facing surface and a frustoconical surface that tappers radially outwardly from the radially inward facing surface at the cylindrical opening, the frustoconical surface being configured to radially compress at least a portion of a resilient member during attachment of the interchangeable component to the housing, the housing also having a groove extending radially outward of at least a portion of the frustoconical surface configured to retain the interchangeable component to the housing in a bayonet latching fashion; and
   at least one resilient member retainable within a circumferentially extending channel in a radially outward facing surface of the interchangeable component, configured to seal the radially outward facing surface to the radially inward facing surface, wherein the at least one resilient member includes a first O-ring, and further comprising a second O-ring seated in a separate circumferential channel of the interchangeable component from the first O-ring, wherein the first and second O-rings are both on an opposite side of the groove from the frustoconical surface.

2. The system as recited in claim 1, wherein both the first O-ring and the second O-ring engage a cylindrical, non-frustoconical surface of the housing.

3. The system as recited in claim 1, further comprising an imaging sensor package seated in the housing opposite from the interchangeable component, wherein the imaging sensor package includes an imaging sensor.

4. The system as recited in claim 3, wherein the imaging sensor package is sealed to the housing.

5. The system as recited in claim 4, wherein the housing includes a seal groove with a seal seated therein, wherein the seal sealingly engages both the housing and the imaging sensor package.

6. The system as recited in claim 3, wherein the housing defines a camera enclosure housing electrical components in electrical communication with the imaging sensor, wherein the imaging sensor package is sealed against the housing to seal off the camera enclosure.

7. The system as recited in claim 6, wherein there is an optical path from the interchangeable component to the imaging sensor package that is free of windows.

8. The system as recited in claim 5, wherein the seal groove of the housing is a circumferential groove that faces inward, away from the interchangeable component.

9. The system as recited in claim 5, wherein at least one of an O-ring, adhesive, or thermally conductive material seals the housing to the imaging sensor package.

* * * * *